United States Patent [19]

Venturini

[11] Patent Number: 4,754,361
[45] Date of Patent: Jun. 28, 1988

[54] RESINATED CAPACITIVE-BODY CAPACITOR WITH INTERSPACE AND EXPLOSION-PREVENTING DEVICE

[75] Inventor: Lucio Venturini, Bologna, Italy

[73] Assignee: Ducati Energia, S.p.A., Bologna, Italy

[21] Appl. No.: 900,087

[22] Filed: Aug. 25, 1986

[30] Foreign Application Priority Data

Jan. 20, 1986 [IT] Italy .............................. 83302 A/86
Mar. 27, 1986 [IT] Italy ............................. 60344/86[U]

[51] Int. Cl.$^4$ ............................................. H02H 7/16
[52] U.S. Cl. ..................................... 361/15; 361/275; 361/272
[58] Field of Search ................... 361/15, 272, 274, 275

[56] References Cited

U.S. PATENT DOCUMENTS

| | | | |
|---|---|---|---|
| 3,473,088 | 10/1969 | Ernst | 361/15 |
| 3,553,542 | 1/1971 | Netherwood | 361/274 |
| 4,059,848 | 11/1977 | Koel et al. | 361/272 |
| 4,106,068 | 8/1978 | Flanagan | 361/272 X |
| 4,209,815 | 6/1980 | Rollins et al. | 361/274 X |
| 4,240,126 | 12/1980 | Sanuito | 361/275 X |
| 4,454,561 | 6/1984 | Pearce et al. | 361/275 |
| 4,538,025 | 8/1985 | Coe et al. | 361/272 X |
| 4,580,189 | 4/1986 | Dequasie et al. | 361/272 |

FOREIGN PATENT DOCUMENTS

| | | |
|---|---|---|
| 2348483 | 4/1975 | Fed. Rep. of Germany . |
| 2313757 | 12/1976 | France . |
| 1291291 | 10/1972 | United Kingdom . |
| 2089127 | 6/1982 | United Kingdom . |

*Primary Examiner*—A. D. Pellinen
*Assistant Examiner*—Derek S. Jennings
*Attorney, Agent, or Firm*—Wells, St. John & Roberts

[57] ABSTRACT

A resinated capacitive-body capacitor with interspace and explosion-preventing device having an encasing shell for a capacitive body which is englobed in a hardened resin and further including a cap with a pressure activable disconnecting device fuse enclosed in the respective encasing plastic shell, being of a soft spongy interspace material, between said encasing shell and said hardened resin with capacitive body provided.

3 Claims, 1 Drawing Sheet

U.S. Patent
Jun. 28, 1988
4,754,361
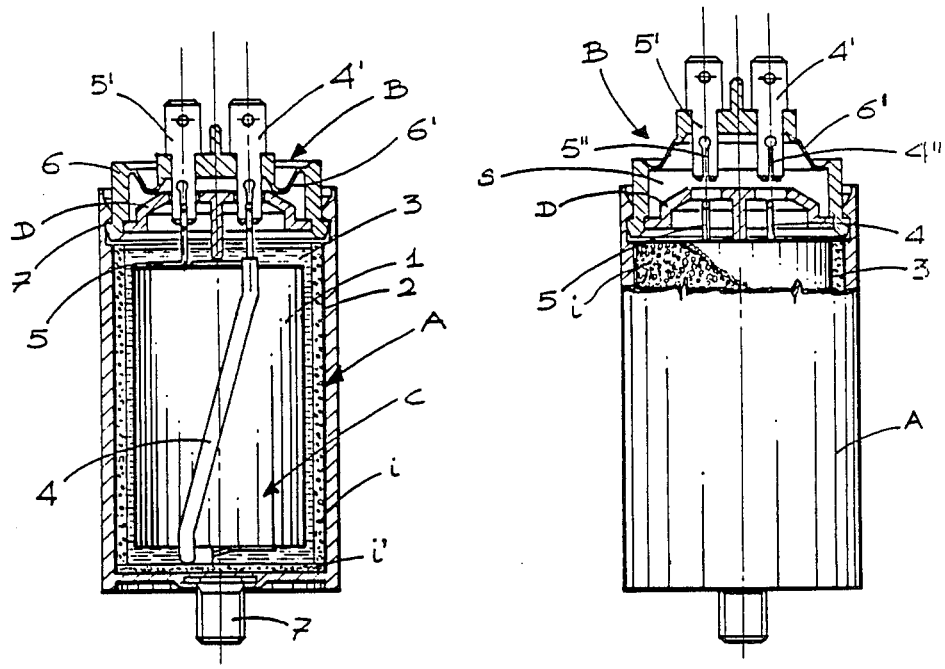
Fig. 1.
Fig. 2.
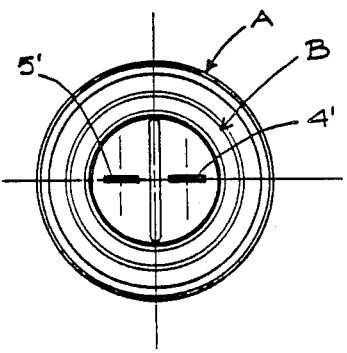
Fig. 3.

RESINATED CAPACITIVE-BODY CAPACITOR WITH INTERSPACE AND EXPLOSION-PREVENTING DEVICE

BACKGROUND OF THE INVENTION

This invention relates to a RESINATED CAPACITIVE-BODY CAPACITOR WITH INTERSPACE AND EXPLOSION-PREVENTING DEVICE.

This invention finds peculiar and convenient application to capacitors equipped with explosion-preventing devices by a pressure activated fuse or disconnecting device enclosed in an encasing plastic shell.

In the present state of the art, explosion-preventing devices are well-known and consist of a pressure-activated movable part in their cover. At pressure increase, when, for example, owing to a short circuit inside the capacitor, a certain amount of gas is produced, and said movable part goes away from the capacitive body, snatching the respective electric conductors wires switching off the electric circuit. In this way the danger of bursting of the capacitor is avoided. In these solutions the capacitive body is in air freely or in oil encased in the respective encasing shell. Reference is made to the Standard Elektrik Lorenz AG Stuttgart— German Patent Disclosure "Auslegeschrift" No. 2348483 filed on Sept. 26 1973 and published on Apr. 10 1975.

Resinated capacitors so called "dry capacitors" are known where the solidified (hardened) resin encloses in a whole all its capacitive body and its container and a movable part disconnecting device (explosion-preventing device) in its cap or cover. These capacitors have the resin welded to the respective casing shell and when a short circuit raises far from the explosion-preventing device, it cannot react on said explosion-preventing device because the pressure increase remains encased between the capacitive body and the corresponding container in that far area, so that the explosion cannot be avoided.

The same Assignee of the Applicant in a copending Giorgio Lamma et al. U.S. patent application has suggested some solutions in order to avoid this drawback. In this patent application is suggested the utilization of an extremely thin shell that contains the capacitive body and its solidified resin in order to realize a preassembled. This preassembled shall be inserted in the respective container or encasing shell, being the first one smaller in diameter and length than the second one realizing an air interspace chamber around the capacitive body between the two respective shells. This air interspace chamber is realized by spacers in said interspace chamber. However, this solution is very expensive and involves greater processing phases, so that the cost of this capacitor cannot be competitive with the traditional solutions needing two encasing shells.

This invention as claimed is intended to remedy these drawbacks. Concerning the respective anti-explosion device by pressure activable fuse, other solutions designed in plastic material utilize a cover provided with an "annular baffle" with the electric connections fixed to it. At pressure increase it moves outwards, snatching the electric connections and switching off the electric circuit in order to carry out the over-pressure protecting function. In these solutions further drawbacks occur because the action of taking away the electric connection portion in order to snatch away the electric conductors (bellows or baffle) not always results in the switching off of said connections for example, owing to their unforseen extension or greater resistance to traction; reaction times are further lengthened so that when the over-pressure protection intervenes the damage is at this point irreparable, since the switching off occurred too late.

For this purpose, intermediate-diaphragm solutions have been suggested. These are placed inside under the respective cap or cover and fixed to the capacitor structure or capacitive body, aiding in snatching the electrical conductors electrically connected under it. This solution is disclosed in Ernst U.S. Pat. No. 3,473,088 patented Oct. 14, 1969 "PRESSURE-ACTIVATED FUSE FOR ELECTRICAL COMPONENTS" and Netherwood No. U.S. Pat. No. 3,553,542 patented Jan. 5, 1971. Other similar solutions are suggested in French patent application Disclosure No. 2313757 patent application No. 7616853 filing date Mar. 6, 1976 in the name of BICC LIMITED GB.

This invention as claimed is further intended to guarantee a safe and immediate switching off of the electric connections, also with low pressure increases in incipient heating phase due to possible short-circuit by the use of a diaphragm according to the above-mentioned principle. Moreover, the invention as claimed is intended to carry out a very cheap and functional capacitor, being its entire encasing frame realized in plastic material without preventing thus the greatest functionality and reliability particularly with reference to antiburst effects.

SUMMARY OF THE INVENTION

According to characteristics as mentioned in the enclosed claims, the present invention solves the problem by the use of a soft and spongy air pressure transmitting interspace material.

Advantageously said interspace material is air transpiring.

In this way said interspace material permits to insert the capacitive body and cast the respective resin directly into the same case, so that another internal containing-shell is no longer necessary, the air space being replaced by this spongy interspace material and allowing the following functions:

to contain the capacitive body and the cast resin up to its hardening;

to act as a soft interspace in order to allow a possible gas generation or, in any case, a pressure increase from a short circuit, finds its way to the activation chamber of the respective pressure disconnection fuse explosion-preventing device.

In the preferred embodiment the pressure disconnection fuse explosion-preventing device inside the capacitor is conceived as a movable part in the respective plastic cap with a plastic-intermediate-separating diaphragm between the cap or cover and the respective capacitive body placed, being the intermediate separating diaphragm fixed stationarily to the capacitive body or to the respective encasing shell, wherein:

a capacitive body is encased in the respective shell case by an intermediate porous flexible and/or deformable material, being the capacitive body electrically cross or transversely connected in its upper part through the respective terminals to a portion deflectible under pressure of a respective plastic sealing cap or cover under a plastic separating diaphragm, determining the disjunction of said cross electric connections in antiburst condition.

The advantages obtained by means of this solution essentially consist in the realization of a low cost capacitor with an encasing shell entirely made of plastic material endowed with the greatest reliability and quickness of reaction due to shearing action, which is made easier by the diaphragm solution and the presence of an air transpiring porous material encircling the capacitive body. Further advantages offered by this invention are mainly the realization of a safe explosion-preventing device with very low production costs.

DESCRIPTION OF THE DRAWINGS

One way of carrying out the invention is described in detail below with reference to drawings which illustrate only one specific embodiment, in which:

FIG. 1 is an axial section of a capacitor that is carried out according to the present invention. It shows the internal capacitive body with the corresponding non-activated explosion preventing device.

FIG. 2 is a view of the capacitor as shown in the preceding figure, but with an activated explosion preventing device. This illustration is partially devoid of the respective coatings.

FIG. 3 is a view from above the capacitor as in the preceding figure.

DESCRIPTION OF THE PREFERRED EMBODIMENT

As shown in the preceding figures, a capacitor is made of a plastic case (A) and a spongy flexible or soft intermediate interspace material (i, i') placed in its interior.

After having cast the liquid resin (3) into it, the capacitive body (C) is fitted inside the said case or casing shell (A) with generally longitudinally extending electric terminals (4 5), each having a longitudinally extending slot, which have been already slidably passed through a separating diaphragm (D) and having notch clamps (5" 4"); these terminals are fixed to a central movable part of the cap or cover (B) by a flexible ring diaphragm (6'); the cover is encased inside the case (7) and the respective movable part under increasing of the internal pressure may be pushed upward switching off the electric contact.

When cooled, the internal resin (3) solidifies and stiffly englobes the capacitive body (C). Whenever a short-circuit occurs in the capacitive body even far from explosion-preventing device chamber (s), the pressure increase on such point squeezes the perimetral spongy interspace (i, i') and, flowing into the chamber (s), can react immediately on the explosion preventing device of the cover (B) switching off the circuit.

The soft, spongy interspace shall be made preferably of transpirant and compressible material such as expanded or foamed plastic material either with open cells (polyvinyls, polyethylene, polypropylene etc.) or with closed cells (flexible foamed polyurethane), because the compression in the thickness, due to pressure increase in the short-circuit area, might however enable the overpressure to be discharged towards the explosion-preventing chamber (s) through the same interspace. Obviously the interspace can be made also with porous fibrous material. Consequently in the best solution the interspace is transpirant plastic foamed or fibrous (but of course preferably plastic foamed) so that the pressure increase filters through it and, through the joint not welded line with the case (2) propagates to the explosion-preventing chamber (s).

Of course, the capacitor shall be equipped with adequate means in order to be fixed to a support.

The plastic separating diaphragm (D) is conceived with holes allowing said electrical terminals (4, 5') to pass through it, being the same placed between said capacitive body (C) and said cover (B) having the function of snatching off at least one among said electric conductors (4 5) when activated in antiburst condition. Whenever a short-circuit occurs, in any capacitor part, the pressure increase is immediately transmitted through the interspace material (i) to sealing cover (B), moving the deflecting portion (6'), which lifts with it the electric terminals (5' 4') and disconnects them from the electric conductors (4, 5), helped by the separating diaphragm (D), which remains stationarily fixed.

The disconnection of conductors (5,4) from terminals (5, 4') is made easier because the respective separating diaphragm holes (D) allow the passage in extraction of respective electric terminal stems (5 4), but not the respective conductor wires, electrically cross or transversely connected to them (5 4).

Suitably said separating diaphragm has a constant downwardly concave or bell shape, allowing an effective housing of electric connection terminals and avoiding any contact with hardened resin.

Through this solution, the sure advantage of further reducing the bursting risks produced by short-circuit is obtained.

In this preferred embodiment, said diaphragm (D) is fitted into the respective internal lateral wall of the cover (6). The container or shell case (A) has an upper joint annular seat into which a correspondingly rib annularly obtained on cover lateral wall (6), is fitted.

In a suitable solution the connection terminals (5' 4') in the respective internal connection portion to corresponding conductors (5 4) have a corresponding joint seat (5", 4) that houses the respective conductors (5,4) in tight contact with no welding, in such a way that when terminals support (6') moves away on antiburst device activation, at least one conductor is extracted and consequently the electric contact is switched off. Through this solution, in addition to eliminating welding and respective welding material the sure advantage of an easier switching off of the circuit is obtained in case the saftey device is activated, the respective conductor being engaged transversely by the underside of the diaphragm (D).

It will be obvious to those skilled in the art that various changes may be made without departing from the scope of the invention and the invention is not to be considered to be limited to what is shown in the drawings and described in the specification.

What is claimed is:

1. A capacitor having explosion-preventing features comprising:
    a casing;
    a body englobed within a solidified resin within the casing to form a capacitive resinated body;
    an intermediate soft interspace and gas transpiring foamed material forming a gas transpirant interspace between the capacitive resinated body and casing, and forming a container of the resin for its hardening into solidified form;
    a cap connected to the casing, the cap having an over-pressure deflecting portion and retaining a plurality of generally longitudinally extending electric connection terminals, the connection terminals each having a longitudinally extending slot;

a separating diaphragm stationarily held in position between the cap and capacitive resinated body, the diaphragm defining an explosion-preventing chamber which overlies a lower chamber in the casing in which the capacitive resinated body is received, the diaphragm having a plurality of openings through which the electric connection terminals slidably extend to the lower chamber;

the capacitive resinated body including upwardly projecting electrical conductors, each conductor slidably extending transversely through the longitudinal slot in one of the plurality of electrical connection terminals beneath the diaphragm in the lower chamber for making electrical connection with the respective electrical connection terminal; and wherein the separating diaphragm is downwardly concave having a constant generally bell shape.

2. A capacitor having explosion-preventing features comprising:

a casing;

a body englobed within a solidified resin within the casing to form a capacitive resinated body;

an intermediate soft interspace and gas transpiring foamed material forming a gas transpirant interspace between the capacitive resinated body and casing, and forming a container of the resin for its hardening into solidified form;

a cap connected to the casing, the cap having an over-pressure deflecting portion and retaining a plurality of generally longitudinally extending electric connection terminals, the connection terminals each having a longitudinally extending slot;

a separating diaphragm stationarily held in position between the cap and capacitive resinated body, the diaphragm defining an explosion-preventing chamber which overlies a lower chamber in the casing in which the capacitive resinated body is received, the diaphragm having a plurality of openings through which the electric connection terminals slidably extend to the lower chamber;

the capacitive resinated body including upwardly projecting electrical conductors, each conductor slidably extending transversely through the longitudinal slot in one of the plurality of electrical connection terminals beneath the diaphragm in the lower chamber for making electrical connection with the respective electrical connection terminal; and wherein the separating diaphragm is fitted within an annular shoulder formed in the cap.

3. A capacitor having explosion-preventing features comprising:

a casing;

a body englobed within a solidified resin within the casing to form a capacitive resinated body;

an intermediate soft interspace and gas transpiring foamed material forming a gas transpirant interspace between the capacitive resinated body and casing, and forming a container of the resin for its hardening into solidified form;

a cap connected to the casing, the cap having an over-pressure deflecting portion and retaining a plurality of generally longitudinally extending electric connection terminals, the connection terminals each having a longitudinally extending slot;

a separating diaphragm stationarily held in position between the cap and capacitive resinated body, the diaphragm defining an explosion-preventing chamber which overlies a lower chamber in the casing in which the capacitive resinated body is received, the diaphragm having a plurality of openings through which the electric connection terminals slidably extend to the lower chamber;

the capacitive resinated body including upwardly projecting electrical conductors, each conductor slidably extending transversely through the longitudinal slot in one of the plurality of electrical connection terminals beneath the diaphragm in the lower chamber for making electrical connection with the respective electrical connection terminal; and wherein the casing has an upper annular seat into which a corresponding rib formed in the cap is fitted.

* * * * *